Aug. 14, 1962 C. W. ATTWOOD 3,049,161
SPECIAL NUTS
Filed March 23, 1959
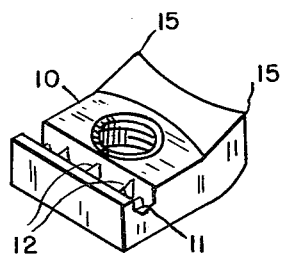
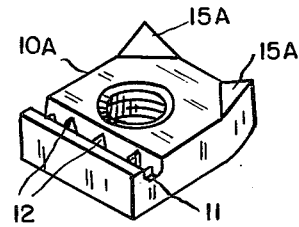
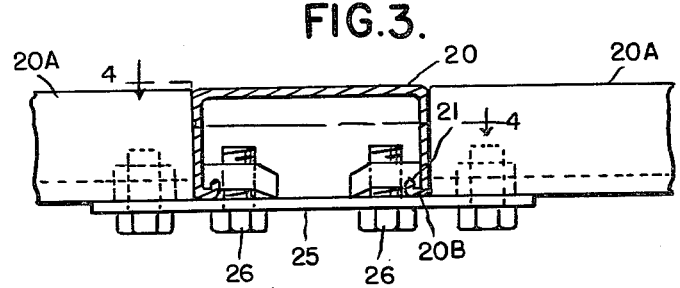
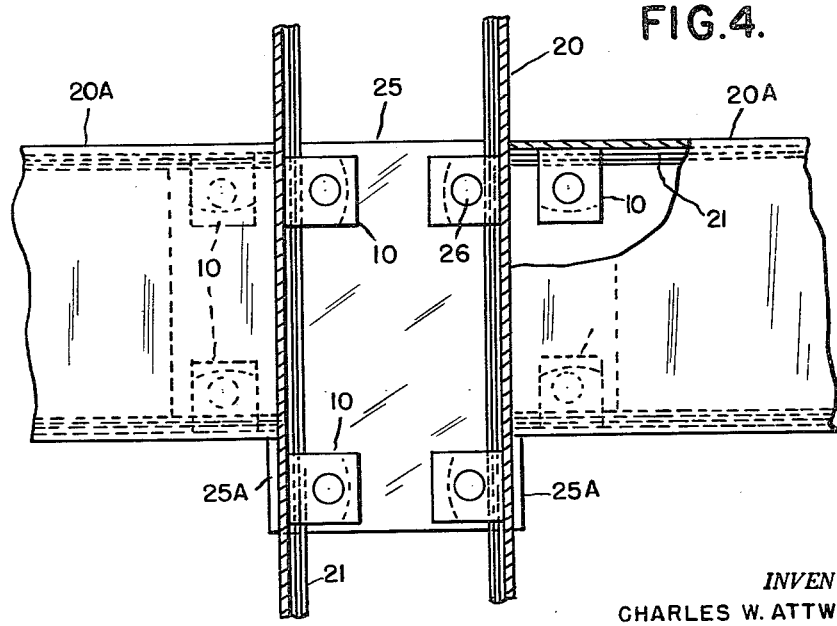
INVENTOR.
CHARLES W. ATTWOOD
BY
Hauke & Hardesty
ATTORNEYS 3,049,161
SPECIAL NUTS
Charles W. Attwood, 4118 S. Wayne Road, Wayne, Mich.
Filed Mar. 23, 1959, Ser. No. 801,136
5 Claims. (Cl. 151—37)

The present invention relates to nuts for use with the framing and construction material sold under the trademark of "Unistrut."

This Unistrut material consists of channel section members of which the side walls of the channels are turned at right angles and then turned inwardly of the channels at right angles so that the resulting member shows in section as rectangular with in one face a slot bordered by inwardly extending flanges, which flanges are usually formed to present a sharp edge.

With such material it is customary in securing other parts thereto to use suitable screws coacting with nuts located inside the channel and having a pair of grooves into which the flanges extend and presenting the threaded openings to the slot so that that the screw may enter.

While channel material having a slot sufficiently narrow to permit such nuts to span it and the flanges may be satisfactory for many purposes, wider channels are often desirable but nuts long enough to receive the inturned flanges in their grooves are not practicable.

Among the objects of the present invention is to provide nuts capable of use with such wide channel members.

Another object is to provide a nut of such form as to receive a single flange.

Another object is to provide a nut which while receiving a single flange will remain in a position normal to to the coacting screw member when the screw member is tightly secured.

Another object is to provide a nut that, when tightened upon the flange, is provided with means resisting the lateral distortion of the flange under loading conditions.

FIGURES 1 and 2 are perspective views of slightly different forms of the nut.

FIGURE 3 is a view, partly in section, showing the use of the nut in securing together wide channel members.

FIGURE 4 is a plan view showing the joint of FIGURE 3, being also in part, sectional.

In the drawings, the nuts 10—10A shown in FIGS. 1 and 2 each consist of a rectangular body perforated and threaded to receive a suitable bolt or screw and of sufficient length to allow the forming of a cross groove 11 adjacent one end. The groove 11 will be provided in its bottom with teeth 12 extending across the groove.

At the other end of the body, FIG. 1, the metal is bent in the direction of the grooved face and somewhat curved so as to provide toothlike corners 15 standing well up from the face of the body portion. In cutting the blank for the nut, the end having the teeth 15 is cleanly cut so that such teeth 15 are quit sharp.

In the form of nut shown in FIG. 2, instead of bending the end of the body as in FIG. 1, only the corners are formed to provide teeth 15A, the intermediate portion being left in plane.

In either form, the nut is of well hardened metal preferably a suitable steel, and the sharp ends of the teeth are arranged to stand up from the face of the body for a distance approximately equal to the depth of groove 11.

FIGS. 3 and 4 illustrate the use of the nut, which may be of either form 10 or 10A—numbered 10 in these figures.

In these figures, the channeled members 20 and 20A, as shown in section in FIG. 3, have their side walls turned in at right angles as at 20B and again turned at right angles to provide a short flange 21 extending toward the bottom of the channel. The edge of this flange 21 is preferably sharpened as shown, and the flange is spaced a short distance from the sidewall of the channel.

In FIGS. 3 and 4, the joint or connection is shown as between a central member 20 and two laterally extending members 20A, identical with member 20, having their ends abutting the side walls of member 20.

These members 20 and 20A are fixed together by means of a suitable plate 25 provided with perforations for the passage of bolts or screws 26, and bolted to the plate with the nuts 10 having the grooves 11 receiving the flanges 20B. In this position, the teeth 15—15A serve to prevent the tilting of the nut and, being sharpened and hardened, when the screw is given a final tightening, will dig into the surface of the plate 25. With the final tightening and tooth penetration, the nuts have two additional functions. They will aid in the resistance against longitudinal movement of the nut on the flange and will also resist rotative movement of the nut under loading conditions with its consequent distortion of the flange.

The height of the flange 20B, the depth of groove 11 and the height of teeth 15—15A should be so coordinated that the teeth strike the plate 25 before the last few thousandths inch movement of the nut.

In FIG. 4, the plate 25 is shown as having ears 25A embracing the member 20 and serving as locating elements for the members 20A. As stated above, the nuts are preferably of steel and hardened so that they are considerably harder than the channels 20—20A and plate 25 which are of ordinary cold rolled steel or even softer metal.

It is of course to be understood that in other forms of joint or connection, connecting plates other than the particular plate 25 will be used, this being shown only by way of example.

I claim:

1. A nut comprising a rectangular body of hardened metal having a centrally located threaded screw receiving opening, said body being provided in one face with a groove across and adjacent one end and having sharpened teeth at its other end projecting upwardly from the grooved face said grooved face being provided with a plurality of spaced sharpened teeth extending from the bottom of and across said groove.

2. A nut comprising a rectangular body of hardened metal having a centrally located threaded screw receiving opening, said body being provided in one face with a deep groove across and adjacent one end and having sharpened teeth at its other end projecting upwardly from the grooved face, the height of said teeth being substantially equal to the depth of the groove said grooved face being provided with a plurality of spaced teeth extending from the bottom of and across said groove.

3. A nut comprising a body of hardened metal having a threaded screw receiving hole, said body having a groove extending across one face and spaced from said hole, said body having at least one sharpened tooth projecting upwardly from the grooved face on the opposite side of said hole from said groove said groove face being provided with a plurality of spaced sharpened teeth extending from the bottom of and across said groove.

4. A nut comprising a body of hardened metal having a threaded screw receiving hole, said body having a groove extending across one face and spaced from said hole, said body having a pair of sharpened teeth projecting upwardly from the grooved face on the opposite side of said hole from said groove said grooved face being provided with a plurality of spaced sharpened teeth extending from the bottom of and across said groove.

5. The nut as defined in claim 4 and in which said first mentioned teeth are disposed in a line substantially parallel to said groove.

References Cited in the file of this patent

UNITED STATES PATENTS

| | | |
|---|---|---|
| 2,345,650 | Attwood | Apr. 4, 1944 |
| 2,354,976 | Robinson | Aug. 1, 1944 |
| 2,676,680 | Kindorf | Apr. 27, 1954 |
| 2,729,065 | Craggs et al. | Jan. 3, 1956 |

FOREIGN PATENTS

| | | |
|---|---|---|
| 164,598 | Austria | Nov. 25, 1949 |